April 4, 1961 U. HEBEISEN 2,978,260
DISMOUNTABLE TRAILER HITCH
Filed June 8, 1959 3 Sheets-Sheet 1

INVENTOR
Ulrich HEBEISEN
BY
ATTORNEYS

April 4, 1961 U. HEBEISEN 2,978,260
DISMOUNTABLE TRAILER HITCH
Filed June 8, 1959 3 Sheets-Sheet 2

INVENTOR
Ulrich HEBEISEN
BY
ATTORNEYS

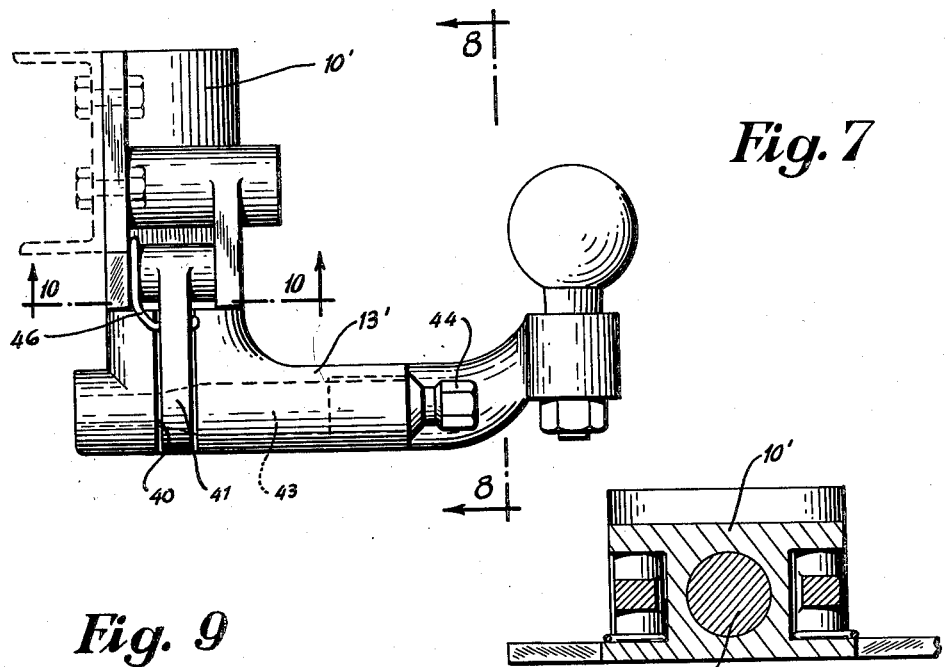
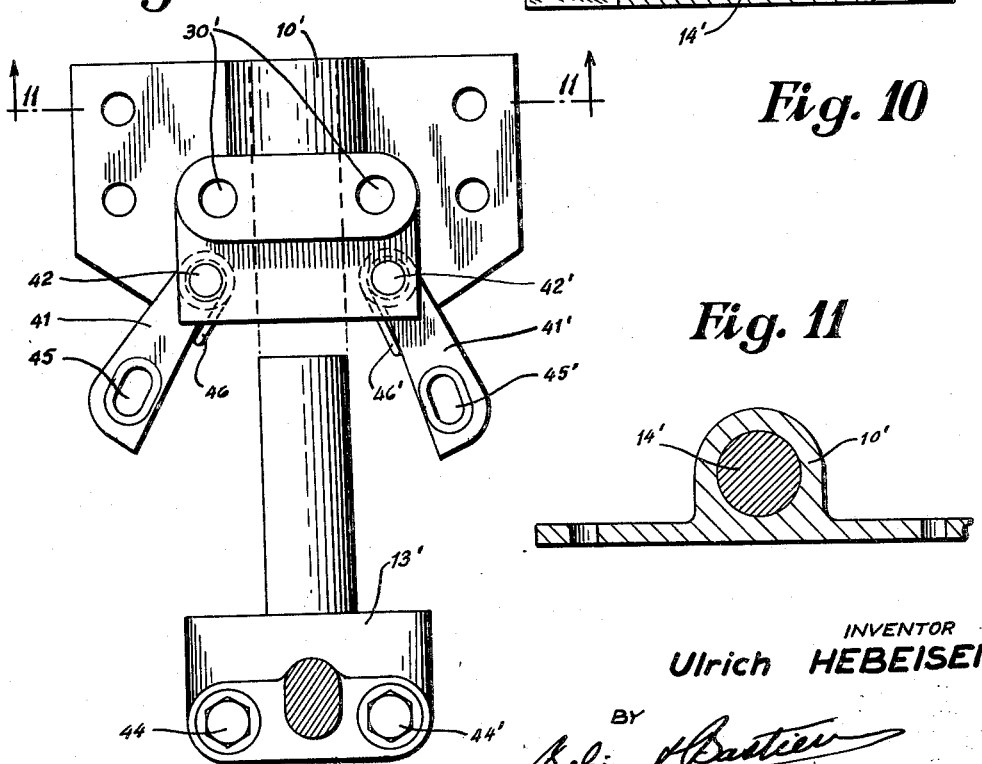

United States Patent Office 2,978,260
Patented Apr. 4, 1961

2,978,260
DISMOUNTABLE TRAILER HITCH
Ulrich Hebeisen, Montreal, Quebec, Canada
(319 Atlas Ave., Toronto, Ontario, Canada)
Filed June 8, 1959, Ser. No. 818,791
7 Claims. (Cl. 280—495)

The present invention relates to a dismountable hitch for attaching trailers to motor cars.

It has been common practice hitherto to fasten trailer hitches, which are usually of the ball type, to the rear bumpers of motor cars. The bumper of the motor car is, however, designed to resist compressive forces, and it may be easily damaged by tensional forces exerted on it by a trailer, especially if the latter is very heavy. Attempts have been made to fasten the hitch directly to the chassis of the motor car; such constructions, however, have not been successful because with them it is difficult to mount the hitch on and remove it from the motor car. For reasons of appearance, the hitch could not be left in position on the motor car when not in use.

It is the object of the present invention to provide a trailer hitch which is very easy and convenient to mount on and remove from the motor car, and which is fastened to the chassis of the motor car.

The hitch in accordance with the present invention consists essentially of two parts, namely of a base member secured more or less permanently to the rear end of the chassis of the motor car, and of a separate arm which carries the ball hitch, the arm being easy to fasten to the base member. The base member is hidden from sight and can, therefore, be permanently retained on the chassis of the motor car and the arm is of such length that the ball hitch, which is mounted on the outer end thereof, clears the bumper of the motor car.

According to the invention the base member has a sleeve portion in which enters a shaft extension of the arm, the arm and base member having means to prevent rotation of the shaft extension in the sleeve portion. The arm is fastened to the base member by means of elements pivoted to the base member and engaged and tightened by other elements mounted on the arm.

Two embodiments of the invention are illustrated in the accompanying drawings in which:

Fig. 7 is a side elevation of the second embodiment of the invention;

Fig. 9 is an exploded front elevation corresponding to Fig. 8 and showing the trailer hitch in dis-assembled condition;

Fig. 10 is a cross-section on line 10—10 of Fig. 7; and

Fig. 11 is a cross-section on line 11—11 of Fig. 9.

Figure 1:
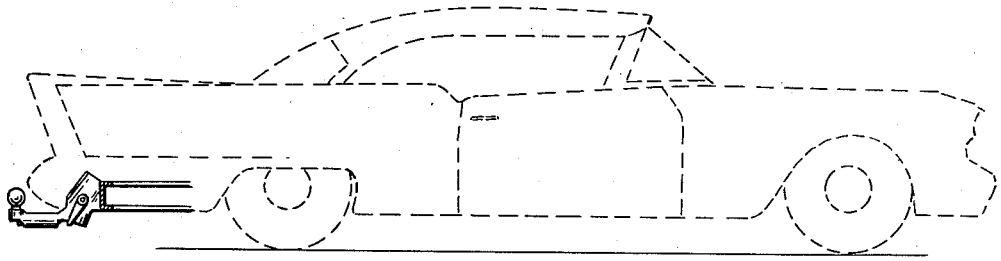
Fig. 1 is a general view of the trailer hitch mounted on a motor car.
Figure 4:
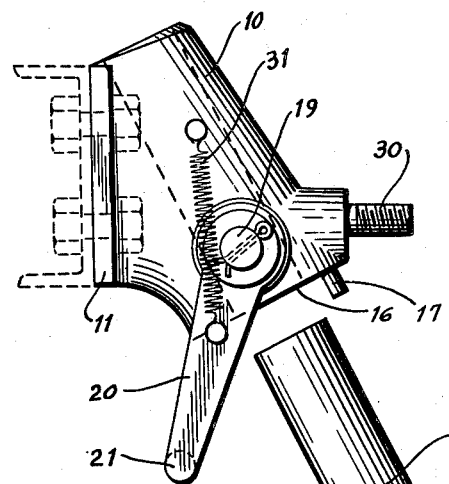
Fig. 4 is an exploded side elevation of the trailer hitch according to the first embodiment.

With reference to Fig. 4, the trailer hitch in accordance with the first embodiment comprises a base member having a sleeve portion 10 and brackets 11 on either side by means of which the base member is bolted to the rear end of the chassis of the motor car (indicated by dotted lines in Fig. 4) as shown more particularly in Fig. 1.

Figure 2:
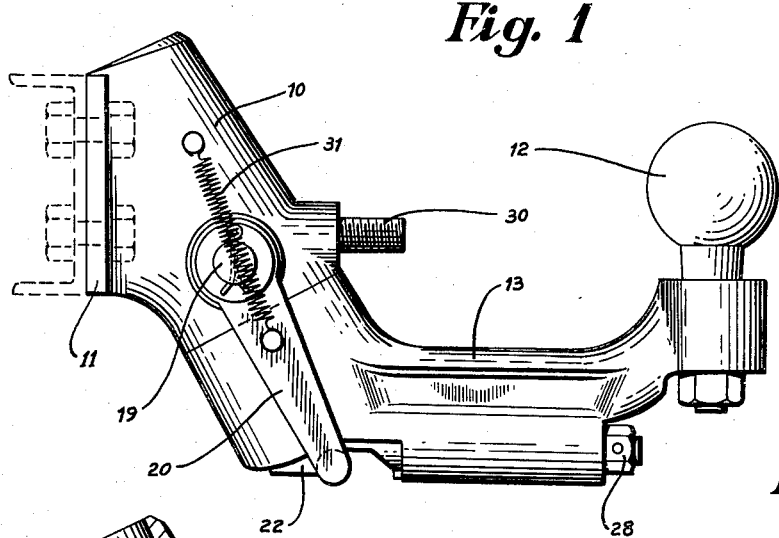
Fig. 2 is a side elevation of a first embodiment in assembled condition.
Figure 3:
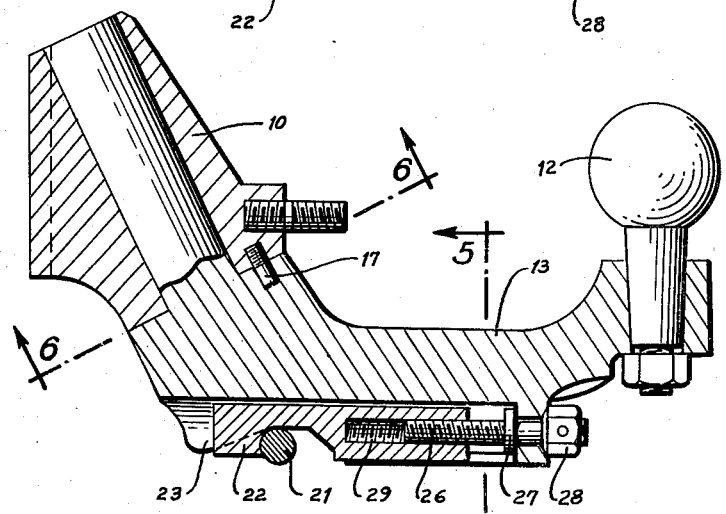
Fig. 3 is a vertical longitudinal section of the trailer hitch according to Fig. 2.

The hitch proper, which consists of a ball 12 or any equivalent member, is bolted to an arm 13 having a shaft extension 14 adapted to enter the sleeve portion 10, as shown more particularly in Figs. 2 and 3.

The arm 13 has at the base of the shaft extension 14 a shoulder 15 which engages the shoulder 16 of the sleeve portion 10, Fig. 4, and a pin 17 screwed into a threaded bore of the base member is adapted to enter a bore 18 of the arm to thereby securely position the arm 13 with respect to the base member. Pivotally mounted on swivel pins 19 secured to the base member is a yoke which is generally U-shaped and comprises a pair of side members 20 and a central rod 21.

The rod 21, as shown in Figs. 3 and 4, is adapted upon pivotal movement of the yoke to engage the arm 13 and a hook 22 mounted in a bore 23 of the arm 13 engages the rod 21 to pull the same towards the right of the figures, to thereby tighten the arm 13 against the shoulder 16 of the base member.

Figure 5:
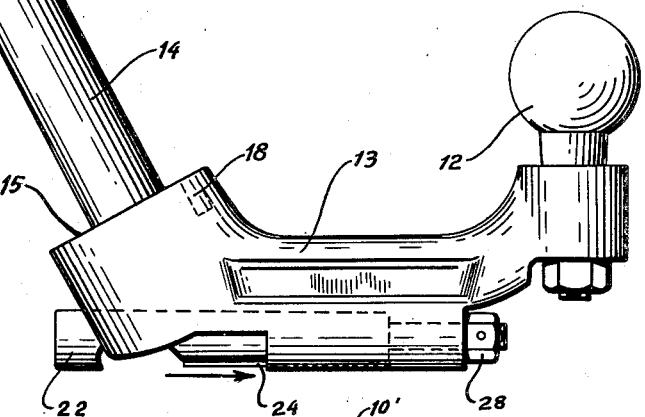
Fig. 5 is a cross-section on line 5—5 of Fig. 3.
Figure 8:
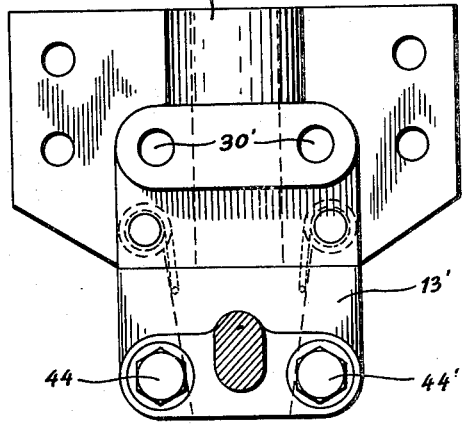
Fig. 8 is a front elevation, partly in section, along line 8—8 of Fig. 7.
Figure 6:
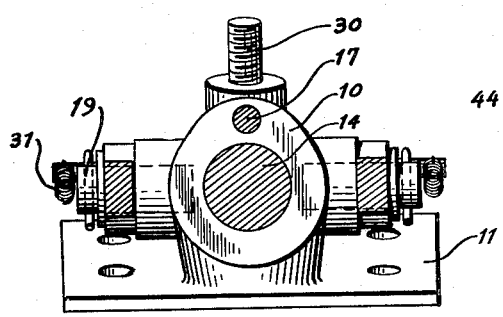
Fig. 6 is a cross-section on line 6—6 of Fig. 3.

As shown more particularly in Fig. 5, the hook 22 has an integral key 24 which engages a slit 25 in the arm 13 to prevent rotation of the hook with respect to the arm. A bolt 26, rotatably mounted in the arm 13 and axially fixed by means of a flange 27 and a nut 28, engages a threaded bore 29 of the hook 22, to pull the same towards the right of the figures to tighten the assembly, when the nut 28 is rotated by means of a wrench. Turning of the nut 28 in the opposite direction causes release of the yoke to permit removal of the arm 13 from the base member.

The base member comprises a utility bolt 30 to provide the possibility of attaching thereto other elements. The yoke formed of elements 20 and 21 is urged in either one of its extreme positions by an over-centre tensional coil spring 31.

In the first embodiment the sleeve portion 10 and the shaft extension 14 are inclined to the verticle whereas the corresponding elements 10' and 14' of the second embodiment, Figs. 7 to 11, are vertically disposed.

The arm 13' of the second embodiment is fastened to the base member by the following means. The arm 13' comprises a pair of recesses 40 on either side, in which are adapted to enter two legs 41, 41' pivotally mounted on shafts 42, 42' of the base member. The arm 13' comprises a pair of longitudinal bores in which are mounted, in the same manner as the hook 22 of the first embodiment, two pins 43, having actuating nuts 44, 44'. The legs 41, 41' comprise holes 45, 45' which are adapted to register with the bores in the arm 13' and to be entered by the pins 43 when the latter are moved longitudinally by turning the nuts 44, 44'.

The holes 45, 45' are somewhat elongated in cross-section to ensure that the ends of pins 43 will enter them, and the ends of pins 43 are tapered so as to tighten the arm 13' against the base member.

In analogy with the first embodiment, the base member of the second embodiment comprises a pair of threaded utility bores 30' for bolting other elements thereto. The legs 41, 41' are urged outwardly by torsional springs 46, 46'.

The embodiments of the invention which have been illustrated and described are given merely by way of example and various modifications are possible within the scope of the appended claims.

I claim:
1. A dismountable trailer hitch for motor cars, comprising a base member secured to the rear end of the chassis of the motor car and having a generally upright sleeve portion; a separate dismountable arm carrying the hitch proper, said arm having a shaft extension adapted to enter said sleeve portion and being of such length as to clear the bumper of the motor car, the main body of said arm extending generally at a right angle to said shaft extension; a retaining member pivoted on said base member and engageable with said arm to retain said arm on said base member; and means on said arm to tighten said retaining member, said tightening means being operable from near the outer free end of said arm.

2. A dismountable trailer hitch according to claim 1, wherein said retaining member is a yoke and said tightening means comprises a hook longitudinally, displaceably, non-rotatably mounted in said arm and adapted to grasp said yoke, and a screw engaging said hook for displacing the same along said arm.

3. A dismountable trailer hitch according to claim 1, comprising a pair of recesses on said arm and wherein said retaining member is formed of a pair of legs pivoted on said base member and adapted to enter said recesses, said arm and legs having registering bores and pins displaceable in said bores to engage said legs and retain said arm against said base member.

4. A dismountable trailer hitch according to claim 3, said pins having tapering portions which constitutes the tightening means serving to tighten said legs against said arm.

5. A dismountable trailer hitch according to claim 2, wherein said yoke has eccentric spring means adapted to urge it in either one of its extreme pivoted positions.

6. A dismountable trailer hitch according to claim 3, wherein said legs have spring means urging said legs away from recess-entering position.

7. A dismountable trailer hitch according to claim 1, wherein said arm and said base member comprise positioning means to prevent rotation of said shaft extension in said sleeve portion.

References Cited in the file of this patent

UNITED STATES PATENTS

| | | |
|---|---|---|
| 933,794 | Sprung | Sept. 14, 1909 |
| 2,569,086 | Zenk | Sept. 25, 1951 |
| 2,639,160 | Studebaker et al. | May 19, 1953 |
| 2,688,496 | Shooltz et al. | Sept. 7, 1954 |
| 2,850,293 | Hall | Sept. 2, 1958 |